United States Patent [19]
Pouliquen et al.

[11] Patent Number: 5,486,994
[45] Date of Patent: Jan. 23, 1996

[54] DEVICE FOR CONTROL OF THE OSCILLATING CIRCUIT OF A VOLTAGE INVERTER OPERATING UNDER QUASI-RESONANCE WITH PULSE MODULATION REGULATION

[75] Inventors: Hervé Pouliquen; Khaled Elloumi, both of Clamart, France

[73] Assignee: Electricite de France-Service National, Paris, France

[21] Appl. No.: 208,524

[22] Filed: Mar. 11, 1994

[30] Foreign Application Priority Data

Mar. 12, 1993 [FR] France ................... 93 02898

[51] Int. Cl.⁶ .................. H02M 3/24; H02M 3/335; H02M 7/5387
[52] U.S. Cl. .................. 363/98; 363/17; 363/132
[58] Field of Search ................... 363/16, 17, 18, 363/97, 98, 131, 132; 323/222, 282, 235, 319

[56] References Cited

U.S. PATENT DOCUMENTS

| | | | |
|---|---|---|---|
| 4,833,584 | 5/1989 | Divan | 363/98 |
| 4,922,397 | 5/1990 | Heyman | 363/98 |
| 5,067,066 | 11/1991 | Chida | 363/16 |
| 5,111,374 | 5/1992 | Lai et al. | 363/98 |
| 5,172,309 | 12/1992 | DeDoncker et al. | 363/132 |
| 5,255,174 | 10/1993 | Murugan | 363/17 |
| 5,274,540 | 12/1993 | Maehara | 363/132 |

*Primary Examiner*—Matthew V. Nguyen
*Attorney, Agent, or Firm*—Sughrue, Mion, Zinn, Macpeak & Seas

[57] ABSTRACT

Pulse width modulation quasi-resonant voltage inverter including a bridge (2) and an oscillating circuit consisting of an inductance (5) in series with the voltage source (1) and of a capacitor (6) in parallel with the bridge (2), the sampling period was much greater than the resonance period, characterized in that it includes a controlled component operating in blocked/saturated mode (7) in parallel with the capacitor (6) and a voltage sensor (8) parallel with the capacitor (6), the component (7) being controlled by the sensor (8) so as to short-circuit the capacitor (6) when the voltage across the latter's terminals is zero and to enable the transitions of the signal for control of the pulse width modulation regulation.

7 Claims, 2 Drawing Sheets

5,486,994

DEVICE FOR CONTROL OF THE OSCILLATING CIRCUIT OF A VOLTAGE INVERTER OPERATING UNDER QUASI-RESONANCE WITH PULSE MODULATION REGULATION

BACKGROUND OF THE INVENTION

The invention relates to voltage inverters which operate under quasi-resonance and which include pulse width modulation regulation.

Such inverters are described in the French Patent Application filed on 26 August 1991 for "Process for regulation of a voltage inverter operating under quasiresonance" under the number 91 10 607. The subject of this patent application is a process for regulating a voltage inverter operating under quasi-resonance, including a monophase or polyphase bridge with controlled components operating in blocked/saturated mode and an oscillating circuit arranged on the DC voltage side and consisting of an inductance in series with the voltage source and a capacitor joined in parallel to the controlled-component bridge, in which pulse width modulation regulation is carried out, the sampling period for which is much greater than the resonance period of the oscillating circuit.

According to this process, the pulse width modulation control pulses are formed by series of sinusoidal arcs and the control transitions are to be effected at discrete times, namely the zero-crossings of these arcs.

This process makes it possible to separate the function of retention, by analog means, at high frequency of the short-circuits required for sustaining the oscillation, from the actual function of regulation of the load of the inverter. This allows the use of digital regulators operating at frequencies below the resonance frequency and which can take into account the characteristics of the load.

This process therefore allows the association of the advantages specific to resonance at high frequency, namely volume reduction and efficiency and those of numerical controls, namely flexibility of processing, adaptability and optimization.

Applications with high power can be envisaged. The greater the power, the lower is the switching frequency of the controlled components, owing to switching losses.

SUMMARY OF THE INVENTION

The present invention therefore proposes not to accomplish the retention of the short-circuits with the controlled components of the bridge. In accordance with the earlier known process, it is then necessary to decouple, at the level of the structure of the converter, that which is related to the sustaining of the oscillation from that which is related to the monitoring of the load. Thus the oscillation can be at high frequency.

The subject of the present invention is therefore a voltage inverter operating under quasi-resonance with pulse width modulation regulation, including a monophase or polyphase bridge with controlled components operating in blocked/saturated mode and an oscillating circuit arranged on the DC voltage side and consisting of an inductance in series with the DC voltage source and a capacitor joined in parallel to the controlled-component bridge, in which pulse width modulation regulation is carried out, the sampling period for which is much greater than the resonance period of the oscillating circuit, characterized in that it includes a switching element for sustaining resonance consisting of the joining in series of controlled components operating in blocked/saturated mode and which is joined in parallel with the capacitor of the oscillating circuit and a voltage sensor joined in parallel with the capacitor of the oscillating circuit, the said resonance switching element being controlled by the said voltage sensor so as to short-circuit the capacitor of the oscillating circuit when the voltage across the latter's terminals is zero and to enable the transitions of the signal for control of the pulse width modulation regulation.

The switching element joined in parallel with the capacitor of the oscillating circuit enables resonance to be sustained and brings about the successive short-circuits on the capacitance of the oscillating circuit at the resonance frequency. The controlled-component bridge operates at a switching frequency which is much smaller than the resonance frequency.

This makes it possible to obtain a fast switching element for which the switching times are short, whilst taking into account the dimensioning constraints in terms of current and voltage.

The series of controlled components can consist of bipolar transistors, in particular insulated-gate bipolar transistors or of MOS transistors.

According to another characteristic of the invention, the inverter includes a clipper joined in parallel with the capacitor of the oscillating circuit, the said clipper limiting the voltage across the terminals of the capacitor of the oscillating circuit to a threshold voltage.

This clipping device makes it possible to avoid overvoltages in the oscillating circuit brought about by the switching of the controlled-component bridge.

Moreover, it makes it possible to limit the voltage having to be withstood by the switching element.

According to one embodiment, this clipper consists of a series circuit consisting of a clipping capacitor and of a controlled interrupter consisting of a controlled component operating in blocked/saturated mode and furnished with an antiparallel-configured diode, the said series circuit being joined in parallel with the inductance of the oscillating circuit, the controlled interrupter being controlled by the voltage sensor joined across the terminals of the capacitor of the oscillating circuit so as to short-circuit the said clipping capacitor when the sensor detects a voltage greater than the threshold voltage.

According to a further characteristic of the invention, the inverter includes, in addition to the diodes joined conventionally in antiparallel configuration with the controlled components of the bridge, a diode joined in antiparallel configuration with the capacitor of the oscillating circuit.

This diode makes it possible to absorb, during switchings of the controlled-component bridge, the currents with negative values, the maximum value of which is equal to around twice the load current. This also makes it possible not to over dimension the diodes which are mounted in antiparallel configuration with the controlled components of the bridge.

Other characteristics and advantages of the invention will emerge from the description which follows, with reference to the attached drawings in which:

DESCRIPTION OF PREFERRED EMBODIMENTS

Figure 1:
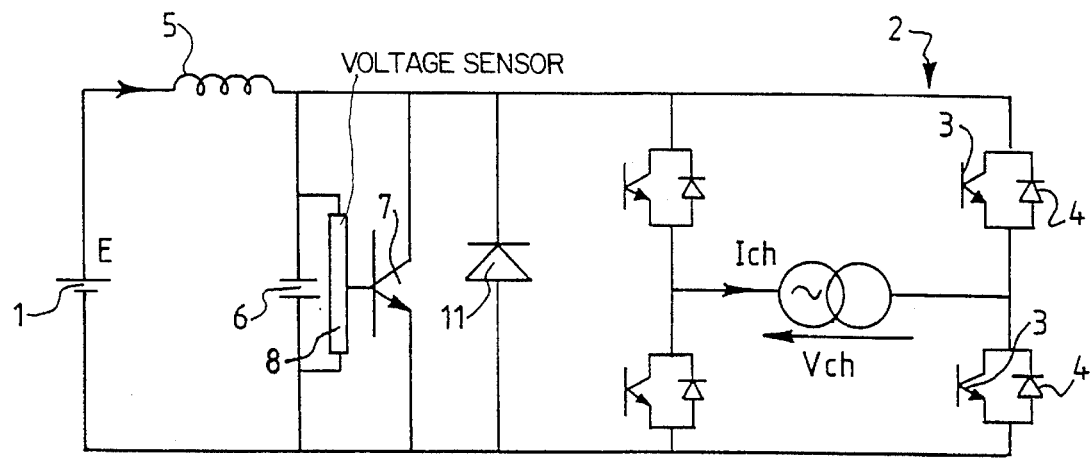
FIG. 1 is the diagram of an inverter according to the present invention.

FIG. 1 is the diagram of a voltage inverter operating under quasi-resonance with pulse width modulation regulation. A DC voltage source I with voltage E, feeds a bridge 2 having controlled components 3 operating in blocked/saturated mode, that is to say with controlled energizing and controlled de-energizing; a free wheel diode 4 is antiparallel configured with each of the controlled components 3 of the bridge 2.

Quasi-resonance operation is achieved through an oscillating circuit arranged on the DC voltage side; it consists of an inductance 5 in series with the DC voltage source 1 and of a capacitor 6 in parallel with the bridge 2.

Regulation of the AC current supplied by the inverter is achieved by a conventional pulse width modulation process, the regular sampling period Te of which is much greater than the period of the oscillating circuit consisting of the inductance 5 and the capacitor 6.

According to the invention, a switching element 7 operating in blocked/saturated mode and a voltage sensor 8 which controls the switching element 7 are joined in parallel with the capacitor 6. The current sensor 8 controls the energizing of the switching element 7 when it detects a zero voltage across the terminals of the capacitor 6. In this way, oscillation of the oscillating circuit is sustained. The resonance frequency of this oscillating circuit is appreciably higher than the control frequency of the bridge 2 which is controlled by pulse width modulation regulation achieved preferably with a digital circuit.

Figure 2:
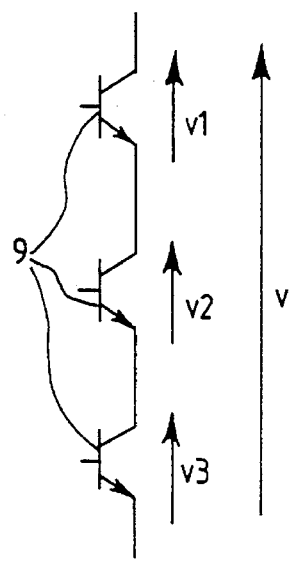
FIG. 2 shows an illustrative embodiment of the switching element charged with sustaining resonance.

Advantageously, as represented in FIG. 2, the switching element consists of a series of controlled components operating in blocked/saturated mode 9. These elements are fast components exhibiting short switching times.

It is for example possible to use bipolar transistors, insulated-gate bipolar transistors (IGBT) or transistors of MOS type.

This switching element does not in any way exhibit the same characteristics and performance as the controlled components constituting the bridge of the inverter.

Represented as 11 in FIG. 1 is a diode element mounted in antiparallel configuration to the switching element 7. This diode advantageously consists of the association of several diodes joined in parallel insofar as it is to absorb a current of around twice the load current.

Indeed, the current made to flow in the switching element 7 is positive and negative. When it is positive, this current flows in the switching element. The maximum positive value of this current is equal to the difference between the current passing through the inductance 5 and the current at the input of the controlled bridge, at the time of the short-circuits. This value is then very low.

The maximum negative value of the current is equal to at most around twice the load current Ich. This value is very high when the load current Ich is a maximum.

In the absence of this diode element 11, when the current is negative, it can flow straightforwardly in the diodes 4 joined in antiparallel configuration with the controlled components 3. Accordingly, the overdimensioning constraint caused by the negative current gets transferred to the diodes 4 of the controlled-component bridge.

Figures 3A, 3B:
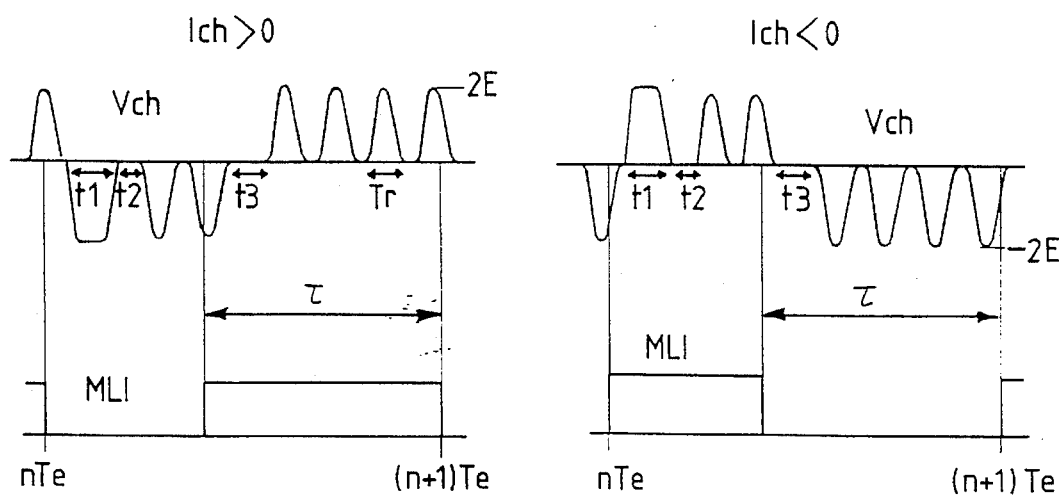
FIG. 3 is a graph illustrating the principle of the control of the bridge by pulse width modulation.

FIG. 3 represents the graph of the control of a quasi-resonant inverter with pulse width modulation regulation. The pulse width modulation pulses are formed by series of sinusoidal arcs and the control transitions are to be effected at discrete times, namely the zero crossings of these arcs. Thus, an uncertainty of the order of the resonance period appears at the level of the definition of the pulse width modulation pulse.

Another significant constraint arises from the distortion of the voltage wave during switchings. Thus, depending on the sign of the load current and the direction of the control transition, overvoltages (clipped) and delays due to linear current loads in the inductance 5 are observed.

In FIG. 3, Ich represents the load current, Vch the voltage across the terminals of the load, Te the sampling period for the pulse width modulation control and $\tau$ the width of the pulse width modulation pulse.

The control is completely symmetric, insofar as, for a positive load current, the pulse $\tau$ corresponds to the control +E whereas for a negative load current, the pulse $\tau$ corresponds to a control −E. In both cases, the pulse, positive or negative, is set to the right. If clipping is carried out, as indicated in the aforesaid French patent application, this phenomenon is situated at the start of the period. It is therefore taken into account accurately since, at that moment, the load current Ich upon which the variations in the various switching times t1 to t3 depend, is measured.

It is observed that the use of the switching element according to the present invention carrying out switching at a frequency appreciably higher than if the interrupters of the bridge of the inverter were used, affords the following advantages. Firstly, the duration of the resonance period can be reduced. Moreover, the switching times t1 to t3 can be reduced. Consequently, the uncertainties of control are reduced thereby bringing about an improvement in the quality of the monitoring of the load.

Figure 4:
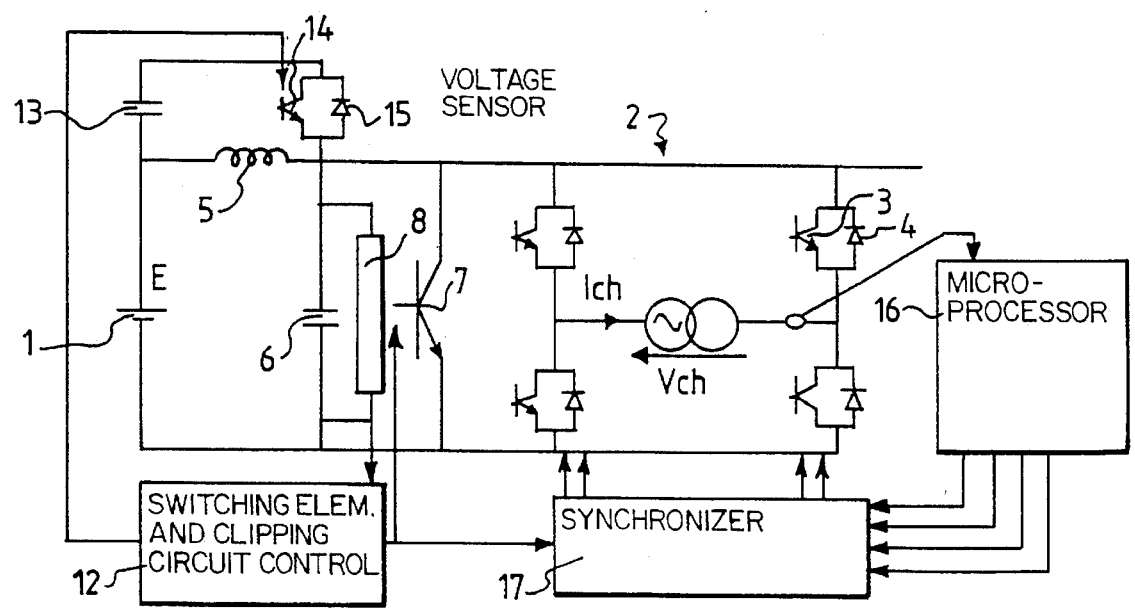
FIG. 4 is a diagram for the embodiment of the invention.

FIG. 4 is the diagram of an illustrative embodiment in which the bridge 2 includes insulated-gate bipolar transistors (IGBT) and the frequency of the oscillating circuit is 20 kHz.

This inverter includes an active clipping device associated with the oscillating circuit. It consists of the voltage sensor 8 whose output signal is sent to a circuit 12 for controlling the switching element 7 and the clipping circuit.

The latter comprises a series circuit consisting of a capacitor 13 and of a controlled component operating in blocked/saturated mode 14 furnished with an antiparallel-configured diode 15; this series circuit is joined in parallel with the inductance 5.

The control circuit 12 controls the energizing of the switching element 7 when the sensor 8 indicates that the voltage across the terminals of the capacitor 6 is zero and then the blocking of this switching element at the end of the duration of the short-circuit required to sustain the oscillation. Moreover, this circuit 12 also provides the command for energizing the controlled component 14 when the voltage provided by the sensor 8 is above a threshold value. At the start, when the voltage exceeds the value of the threshold, it is the diode 15 which conducts. With the blocking of the diode 15, the controlled component 14 becomes conducting and discharges the capacitor 13. The circuit 12 provides the command for blocking the controlled component 14 when the voltage across the terminals of the capacitor 6 regains the threshold value.

Also represented in this figure is a microprocessor 16 which controls the controlled components 3 of the bridge 2 by way of a synchronizer 17, regulation being effected as a function of the value of the load current Ich. The synchronizer 17 also receives a control from the circuit 12 for synchronizing the times of zero crossing of the voltage across the terminals of the capacitor 6 and the transitions of the pulse width modulation control.

It is seen that the invention allows complete decoupling of the sustaining of the oscillation of the oscillating circuit from the control of the bridge 2 feeding the load 8. This makes it possible not to accomplish retention of the short-circuits of the capacitor 6 via the controlled components of the bridge 2 which are dimensioned for the constraints of the load. In the case of a controlled-component bridge of high power, it is possible to use components having a relatively low operating frequency, since the frequency of the pulse width modulation regulation is much lower than the frequency of oscillation of the oscillating circuit.

The use of the voltage sensor 8 and of the clipping circuit also makes it possible to limit the dimensioning of the various controlled components of the inverter.

We claim:

1. Voltage inverter operating under quasi-resonance with pulse width modulation regulation, including a monophase or polyphase bridge (2) with controlled components (3) operating in blocked/saturated (energizing/de-energizing) mode under control of a control signal, and an oscillating circuit arranged on a DC voltage side and consisting of an inductance (5) in series with a DC voltage source (1) and a capacitor (6) connected in parallel with the controlled-component bridge (2), in which pulse width modulation regulation is carried out, a sampling period for which is much greater than a resonance period of the oscillating circuit, characterized in that said inverter includes a switching element (7) for sustaining resonance and comprising a plurality of series-connected controlled components (9) operating in blocked/saturated mode, said switching element being connected in parallel with the capacitor (6) of the oscillating circuit and a voltage sensor (8) connected in parallel with the capacitor (6) of the oscillating circuit, said resonance switching element (7) being controlled by said voltage sensor (8) so as to short-circuit the capacitor (6) of the oscillating circuit when the voltage across the terminals of the capacitor is zero and to enable the transitions of the signal for control of the pulse width modulation regulation.

2. Voltage inverter operating under quasi-resonance according to claim 1, characterized in that the series of controlled components (9) consists of bipolar transistors.

3. Voltage inverter operating under quasi-resonance according to claim 1, characterized in that the series of controlled components (9) consists of insulated-gate bipolar transistors.

4. Voltage inverter operating under quasi-resonance according to claim 1, characterized in that the series of controlled components (9) consists of MOS transistors.

5. Voltage inverter operating under quasi-resonance according to claim 1, characterized in that said inverter includes a clipper (8, 12-15) joined in parallel with the capacitor (6) of the oscillating circuit, said clipper limiting the voltage across the terminals of the capacitor of the oscillating circuit to a threshold voltage.

6. Voltage inverter operating under quasi-resonance according to claim 5, characterized in that said clipper consists of a series circuit consisting of a clipping capacitor (13) and of a controlled interrupter (14) consisting of a controlled component operating in blocked/saturated mode and furnished with an anti-parallel-configured diode (15), said series circuit being joined in parallel with the inductance (5) of the oscillating circuit, the controlled interrupter (14) being controlled by the voltage sensor (8) joined across the terminals of the capacitor (6) of the oscillating circuit so as to place said clipping capacitor (13) in parallel with the inductance (5) when the sensor detects a voltage greater than the threshold voltage.

7. Voltage inverter operating under quasi-resonance according to claim 1, characterized in that said inverter includes a diode element (11) which consists of diodes in parallel and which is joined in antiparallel configuration to the controlled component (7) charged with sustaining the resonance (6) of the oscillating circuit.

* * * * *